US005903817A

United States Patent [19]

Butler et al.

[11] Patent Number: 5,903,817
[45] Date of Patent: May 11, 1999

[54] AUTOMATED HARD-COPY MOBILE REMOTE COMMUNICATION APPARATUS, SYSTEM AND METHOD

[75] Inventors: Myron C. Butler; Mark R. Humphreys, both of Edmond, Okla.

[73] Assignee: Communications Manufacturing Company, Los Angeles, Calif.

[21] Appl. No.: 08/719,486

[22] Filed: Sep. 25, 1996

[51] Int. Cl.$^{6}$ ................................ H04B 1/08; H04Q 7/18
[52] U.S. Cl. .................... 455/31.2; 455/346; 340/825.44
[58] Field of Search ................................ 455/31.2, 31.3, 455/66, 344–346, 517, 521; 340/825.44

[56] References Cited

U.S. PATENT DOCUMENTS 4,806,906 2/1989 Oda et al. .......................... 340/825.44

FOREIGN PATENT DOCUMENTS

WO 90/08431 7/1990 WIPO .

OTHER PUBLICATIONS

Communications Manufacturing Co., "CMC 7960 Series Vehicle Mounting Kits and the CMC 7970A Printer Installation Procedure," section 190–070–001, issue 7, pp. 1–9 (Aug. 1993).

*Primary Examiner*—Andrew M. Dolinar
*Attorney, Agent, or Firm*—McAfee & Taft

[57] ABSTRACT

An apparatus, system and method automatically receive remote communications and automatically print paper copies of messages within the received communications. In a telephone technician's van, a pager is directly connected to a printer. The pager automatically receives a message and transfers the message to the printer, and the printer automatically responds to print the message onto paper.

12 Claims, 3 Drawing Sheets

AUTOMATED HARD-COPY MOBILE REMOTE COMMUNICATION APPARATUS, SYSTEM AND METHOD

BACKGROUND OF THE INVENTION

This invention relates generally to an apparatus, system and method for providing remote communications to a mobile unit, which communications preferably automatically result in a hard-copy of an alphanumeric message contained within the communication. This is particularly applicable to the telephone industry where telephone craft technicians are necessarily out in the field moving from service location to service location in vans and need to automatically receive and print out paper copies of service orders, for example.

Communication systems through which information can be transferred between remote locations may use physically connected systems wireless systems, or both. An example of a physically connected system is the traditional telephone system in which telephone calls between two telephone sets are transmitted through physically connected networks of wires extending from one telephone set to the other. Examples of wireless communication include cellular telephone and paging networks.

In a paging network, an individual pager device is not physically connected to any part of the paging network. It simply responds to electromagnetic transmissions. One type of pager only receives a telephone number via the electromagnetic transmission. The person using the pager reads the phone number through a display in the pager and manually returns the phone call through a separate system (eg., a hard-wired telephone line or a cellular phone).

A more sophisticated type of pager can also receive and display alphanumeric messages contained within the electromagnetic transmission to which it responds. The person using such a pager reads the received message by scrolling through the message displayed in the small display of the pager.

In the telephone industry, pagers are used by telephone craft technicians who are out in the field in their vehicles, which are typically vans. Telephone craft technicians also use mobile microprocessor based field terminals which are hand-held and/or mounted in their vans. Examples of mobile field terminals include those marketed under the trademarks MicroTerminal and DataStar® from Communications Manufacturing Company of Los Angeles, Calif.

To use one of these field terminals, the technician manually makes a physical wire connection to a telephone circuit or cellular phone, downloads a message through the respective communication transmission system, then scrolls through the downloaded message via the screen of the field terminal. A hard-copy paper print-out can be obtained by connecting the terminal to a printer mounted in the technician's vehicle. An example of such a printer is a Star Micronics printer which has been modified to accommodate the spikes and low voltages of a vehicle's electrical system. Such a printer is available through Communications Manufacturing Company (model CMC 7970A).

Telephone craft technicians also use cellular phones which do not need a tangible connection to a transmission system; however, cellular phones do not store messages or print out received messages in paper copies They can be used as a link to the aforementioned field terminals, for example, from which print-outs can then be obtained in the manner described above.

The ability to print out hard-copy in a mobile situation is desirable both because some messages which are received either via an alphanumeric pager or a mobile field terminal are lengthy and cumbersome to read by scrolling through the limited display area of these types of devices. It is also often desirable to have a paper copy of a message for archival or record keeping purposes. This is particularly true within the telephone industry, for example Although the above types of equipment are useful, there is still the need for a simplified communication apparatus, system and method which automatically receive communications into a vehicle without external tangible connection and which automatically and immediately print out a received message onto paper. It would also be desirable for at least a part of such apparatus, system or method to allow for portability by a person who moves away from a mobile unit, such as a telephone craft technician's van, so that the person can obtain some degree of communication access regardless where he or she is.

SUMMARY OF THE INVENTION

The present invention meets the above-noted and other needs by providing a novel and improved automated hard-copy mobile remote communication apparatus, system and method.

The automated hard-copy mobile remote communication apparatus of the present invention comprises a printer that includes a housing providing means for mounting the printer in a vehicle. The printer also includes means disposed in the housing, for printing data onto papers Also included in this apparatus is a pager having a data output connector releasably connected to the means for printing data. The apparatus still further preferably comprises means for releasably connecting the pager to the housing such that the pager can be removed from the printer and the vehicle without removing the printer.

The method of the present invention broadly comprises: transmitting a message through a paging network to an addressed pager disposed in a vehicle; and receiving a transmitted message in the addressed pager and simultaneously activating a printer, directly from the pagers to print onto paper the received message, which printer is disposed in the vehicle and connected to the pager. This method preferably also comprises disconnecting the pager from the printer; moving the disconnected pager away from the vehicle and the printer; receiving another transmitted message in the pager; storing such other transmitted message in the pager, returning the pager to the vehicle and reconnecting the pager to the printer; and actuating the pager to print out a selected stored transmitted message through the reconnected printer.

The automated hardcopy communication system of the present invention particularly relates to the telephone industry. This system comprises a telephone company computer system that includes a computer, which computer is programmed with a service message for a telephone craft technician who is remotely located in a vehicle and which computer is also programmed with a program for transmitting data through a paging network. The system also comprises a printer mounted in the vehicle. This printer has a data input for receiving data defining alphanumeric characters to be printed on paper loaded in the printer. The system still further comprises a pager mounted in the vehicle. The pager includes means for receiving data transmitted from the telephone company computer system through the paging network. The pager further includes means, connected to the data input of the printer, for automatically communicating received data to the printer substantially simultaneously with receiving the transmitted data.

The present invention as defined above simply and economically provides for communicating in such a manner whereby messages are automatically received and automatically and immediately printed out at a remote location, such as, for example, a telephone craft technician's van. This is achieved without external wire connections. The invention described above permits in its preferred embodiment for the pager to be removed from the printer so that the pager can be carried by the user to allow the user to remain in conventional contact via the pager; however, the pager can be reconnected to the printer and any intervening messages then printed out at the command of the user.

Therefore, from the foregoing, it is a general object of the present invention to provide a novel and improved automated hard-copy mobile remote communication apparatus, system and method. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

Figure 1:
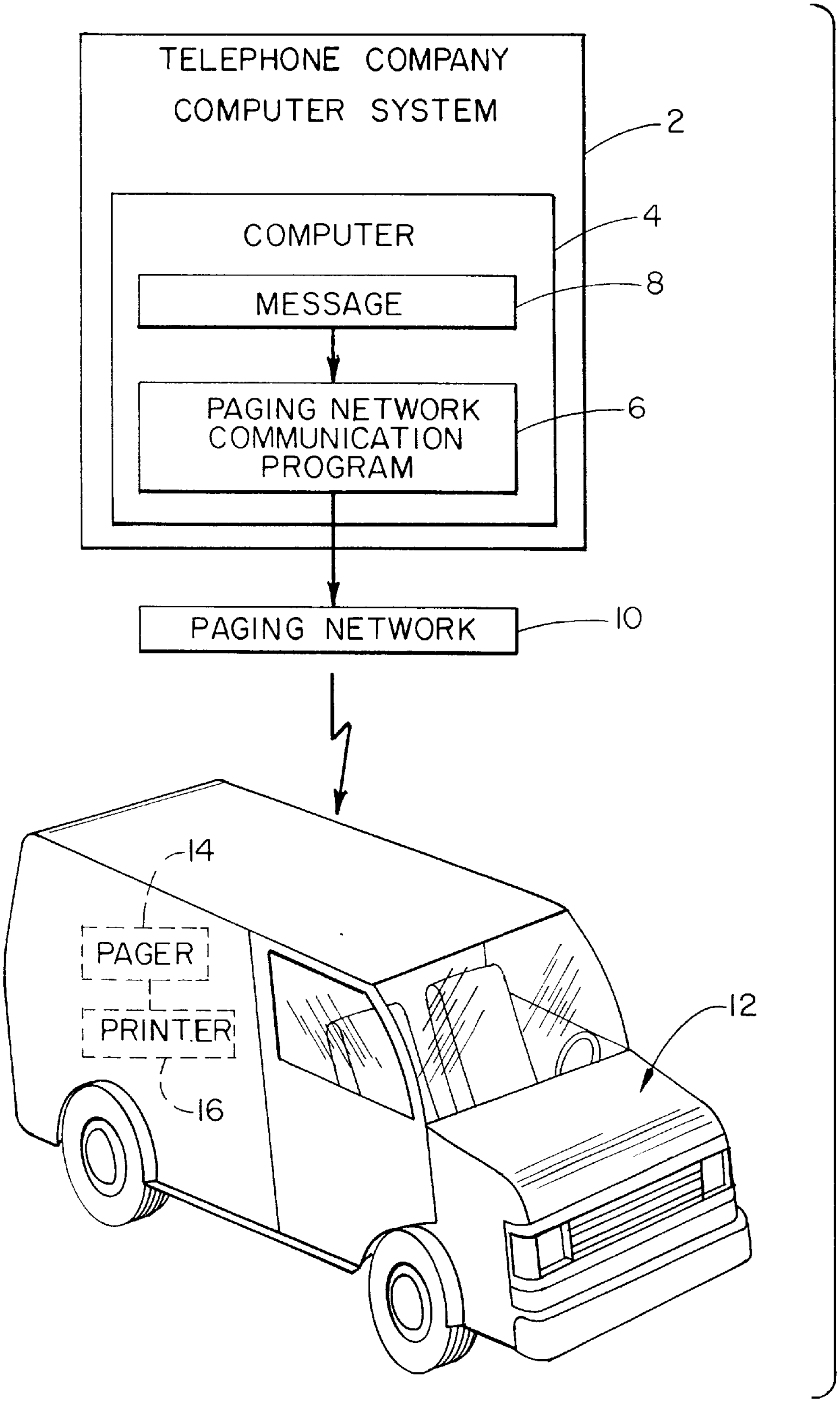
FIG. 1 is an illustration representing the preferred embodiment of the system of the present invention.

A particular system of the present invention is illustrated in FIG. 1. It includes a telephone company computer system 2 comprising a computer 4 programmed with a paging network communication program 6 and a message 8.

The telephone company computer system 2 can be implemented in any desired manner. One example of such a system, or a portion of such a system, is the computerized maintenance system found in a telephone central office. Such a maintenance system includes a gateway processor which is part of the telephone network and which uses an access protocol such as AT&T's Craft Access System (CAS), Bellcore's Technician Access Network (TAN), CIBS's Force Access System (FAS), or GTE's Automated Work Access System (AWAS). The gateway processor is connected to a telephone line so that it can transmit messages onto the hard-wired telephone network.

Through this port with the existing telephone network, the computer system 2 can transmit the message 8, which in one example is a service message to be sent to a telephone craft technician. The message is sent using an application program operating under the operating system or protocol of at least the computer 4 but for the purpose of encoding and transmitting the message 8 such that it is broadcast through a paging network 10. Paging network 10 can be a private network or a commercial network.

A specific example of a computer 4 that can be used is a personal computer operating both under the Windows environment and a compatible paging network communication application program. One example of such an application program is "Notify!" from Ex Machina. Under operation of the application program the alphanumeric characters comprising the textual and/or numeric contents of the message 8 are encoded in a known manner and transmitted, with the accompanying address and other control information, in a manner as known in the art for transmission through the paging network 10.

Any such transmission through the paging network 10 is picked up by mobile units within range of the paging network 10. One illustration of such a mobile unit is illustrated in FIG. 1 as a telephone craft technician's vehicle 12, specifically a service van, in which are mounted a pager 14 and a printer 16 of the present invention. If the transmission from the paging network 10 is for the specific pager 14, as identified within the pager 14 by its internal address encoding, the pager 14 captures the transmission and immediately and automatically communicates the message of the transmission to the printer 16. The printer 16 automatically responds by printing out a hard-copy of the message. The pager 14 operates off its own internal battery, and the printer 16 operates off the vanes conventional electrical system which includes a battery.

Figure 2:
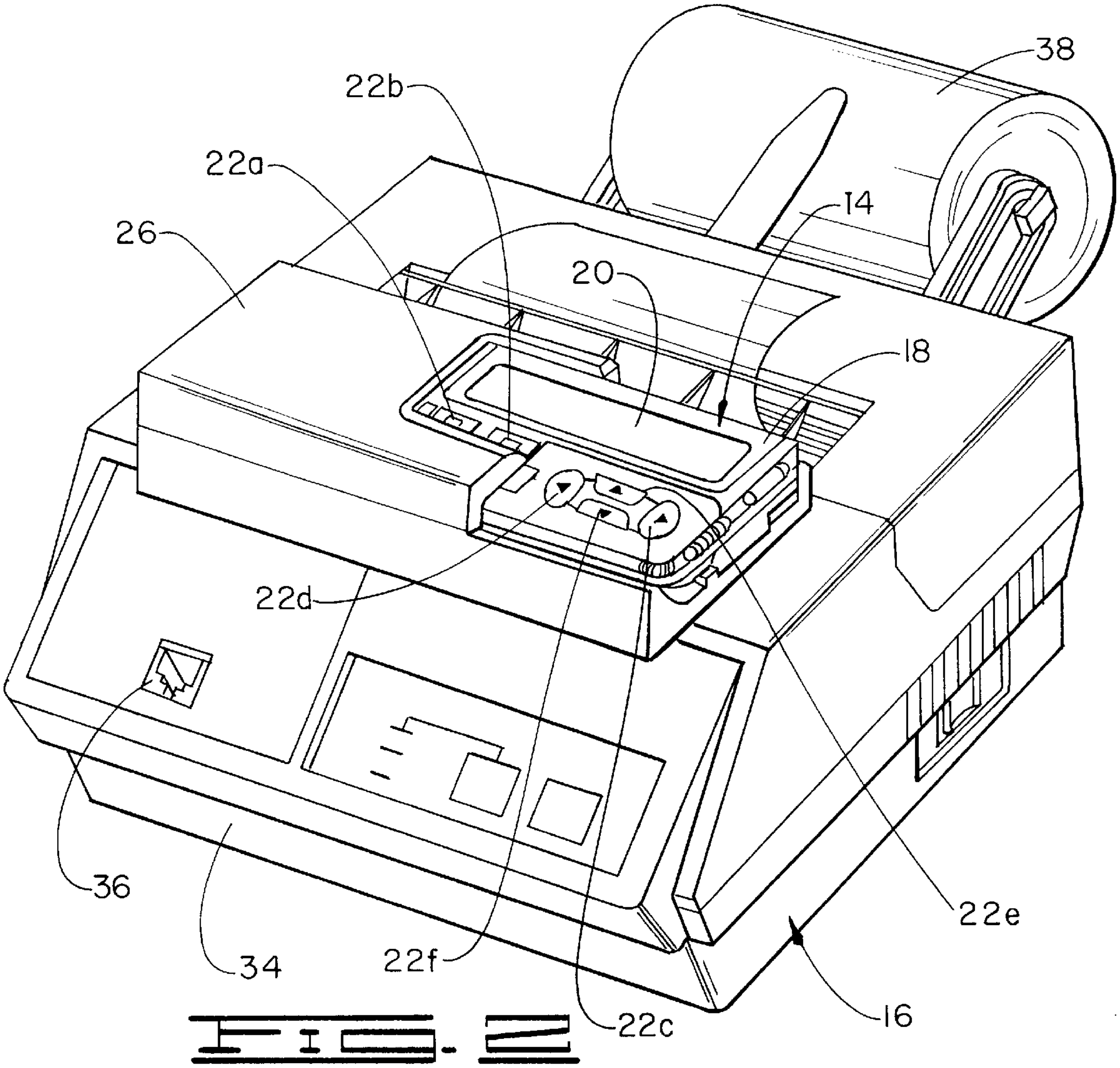
FIG. 2 is a perspective view of a particular implementation of the apparatus of the present invention.

Referring to FIG. 2, a particular implementation of the pager 14 is a Motorola Advisor class pager. This type of pager has a housing 18 in which is mounted an externally visible display 20. The housing 18 also has mounted to it externally accessible buttons or switches 22 (specifically, a red button 22*a*, a green button 22*b* and arrow keys 22*c*, 22*d*, 22*e* and 22*f*) A data output port or connector 24 (FIG. 4) is also accessible through the housing 18. In the particular implementation, the output port is a re-configurable RS232 serial port having three plated contacts located inside the pager housing and accessible through respective holes formed in the adjacent side of the pager housing.

The pager 14 is releasably connected to the printer 16 such that the pager 14 can be removed from the printer 16 and the vehicle 12 without removing the printer 16. One implementation of such a releasable connecting means, but not limiting of other types of such means which can be used, is a mounting holster 26 having sidewalls defining a cavity into which the pager 14 is slidably mounted in known manner.

Figure 3:
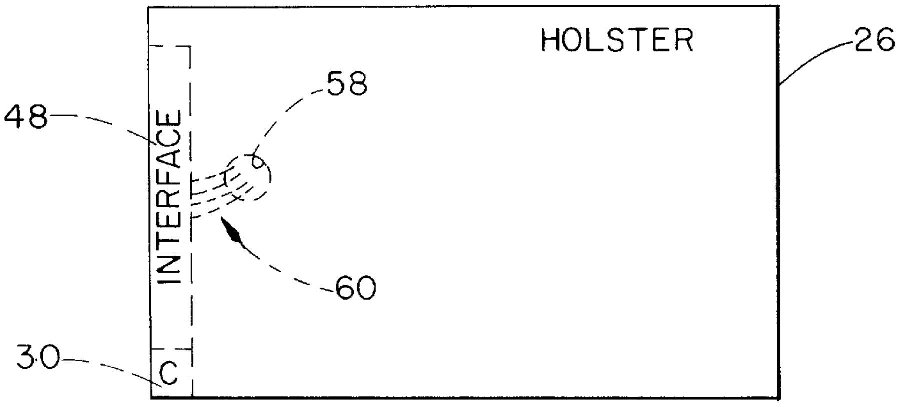
FIG. 3 is a block diagram representing a data communication connector of a mounting holster that releasably retains a pager shown in FIG. 2 and that also receives an interface circuit.
Figure 4:
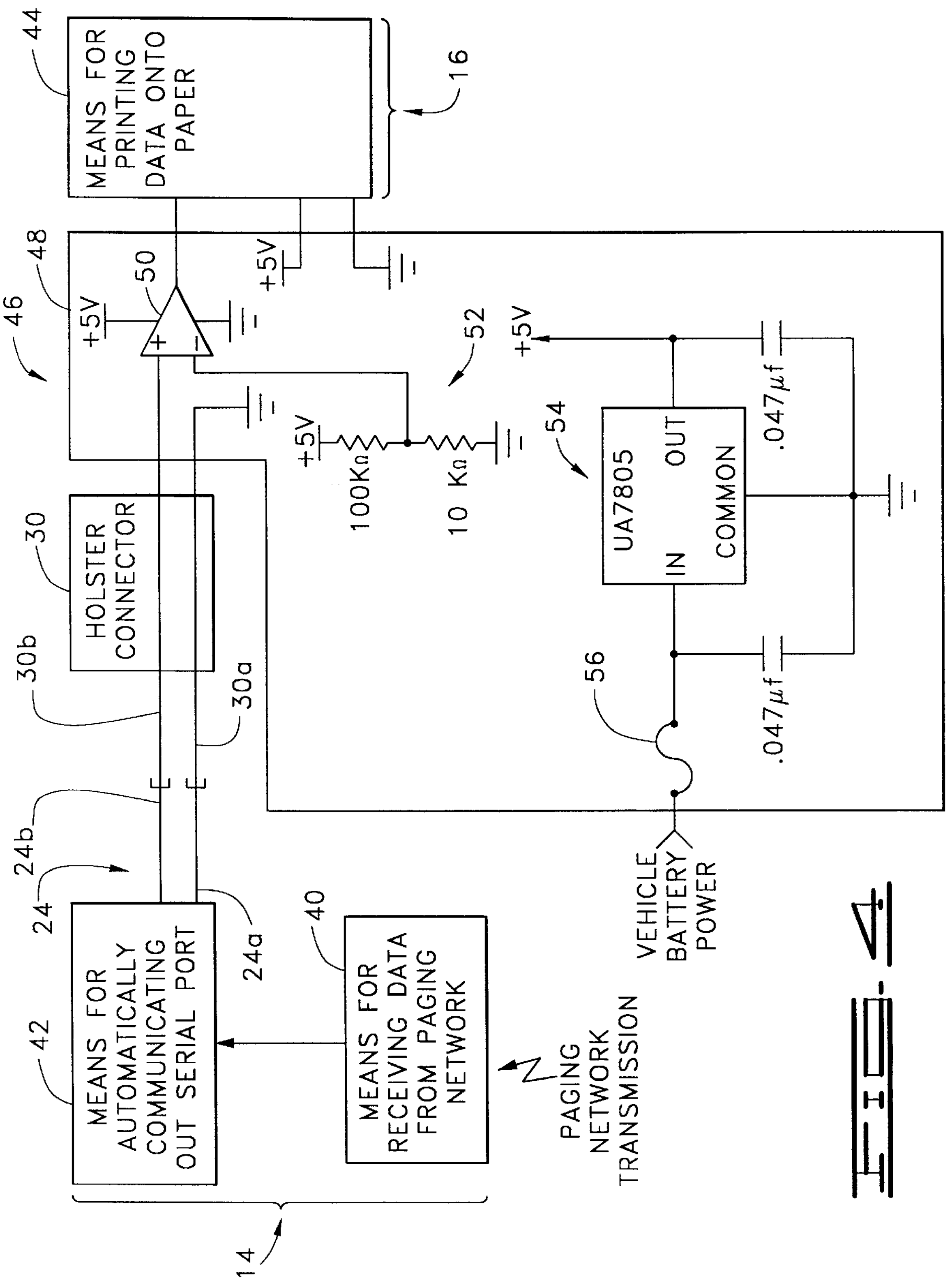
FIG. 4 is a block and schematic diagram of circuit components of the apparatus of FIG. 2.

Although pager mounting holsters are in general known, such as for wearing on a user's belt, the preferred embodiment of the mounting holster 26 is custom made for the present inventions One custom feature includes four holes in its side wall adjacent printer 16. These receive screws by which the holster 26 is attached to the printer 16. Another custom feature is a coupling or connector 30 (FIG. 3) which mechanically and electrically engages the serial output port 24 of the pager 14. In the preferred embodiment, the connector 30 includes miniature spring-loaded gold-plated pins mounted inside the holster 26 in the location illustrated in FIG. 3 (front left as viewed in FIG. 2). Each pin enters the respective hole associated with a respective one of the contacts of the data output port 24 of the pager 14 and engages the contact when the pager 14 is inserted in the holster 26. The preferred embodiment shown in the drawings needs only two pins 30*a*, 30*b* to engage an electrical ground contact 24*a* and a data output contact 24*b* of the output port 24 (FIG. 4).

Referring to FIG. 2, the mounting holster 26 is attached to or mounted on a housing 34 of the printer 16. In the preferred embodiment shown in the drawings, this mounting is by four machine screws with threaded inserts in the aforementioned four holes of the mounting holster 26.

Whereas the holster 26 is mounted on the housing 34 of the printer 16, the housing 34 is itself mounted in the vehicle 12. For the illustrated preferred embodiment, this mounting is by known means used for the CMC 7970A printer, such as described in "CMC 7960 Series Vehicle Counting Kits and the CMC 7970A Printer Installation Procedure" (section 190-070-001, issue 7, August 1993) from Communications Manufacturing Company, which document is incorporated herein by reference.

Disposed in the housing 34 is an externally accessible data input connector 36. Also connected to the housing 34 is a paper roll 38 on which the printer 16 prints its output.

The embodiment of the printer 16 represented in FIG. 2 is that of a Star Micronics printer of the type which has been modified and marketed by Communications Manufacturing Company of Los Angeles, Calif. as referred to above. The modifications are contained within the housing 34 and include circuitry which protects the original equipment of the printer 16 from electrical spikes and low voltages which can occur in the electrical system of the vehicle 12. This circuitry also includes means which recognizes when data is being sent into the printer through the connector 36 on the front of the printer housing 34. It now also responds to data received through the connector 30 of the holster 26 because pin 30*b* of the connector 30 is effectively connected (through a subsequently described interface in the preferred embodiment) with the data input line of the connector 36. This circuitry of the printer 16 also actuates the printer to print out onto the paper of the roll 38 in automatic response to recognizing that data is being sent to the printer This type of printer and these modifications (except for the connection with the connector 30) have been used in the telephone industry mounted in vehicles of the type represented by vehicle 12 for a number of years The printer has a built-in buffer to hold data sent to it, and the printer uses ink ribbon and dot matrix printing.

Referring to FIG. 4, the pager 14 includes inside its housing 18 known circuits providing both means 40 for receiving data from the paging network 10 and means 42 for automatically communicating data out the serial port 24 of the pager 14. The RS232 output 24 from the means 42 is connected to means 44 for printing data onto paper which is implemented by the known circuitry within the printer 16. The connection between the output of the pager 14 and this input of the printer 16 is by a suitable connecting means 46 illustrated in the FIG. 4 implementation as including the holster connector 30 and an interface 48. This connecting means 46 is such that it directly connects the pager 14 to the printer 16. That is, there are no intervening data processing or control devices, only at most signal level conversion and/or power signal providing circuits. Thus, the present invention provides a simple system for receiving transmissions and having them automatically print out.

The interface 48 is used to convert the signal levels between the pager 14 and the printer 16. If the signal levels are compatible, no such interface 48 is needed other than to provide +5-volt power to the printer 16 as illustrated in FIG. 4. This +5-volt power energizes the circuitry in the printer 16 that senses the incoming data from the pager 14 and actuates the printer circuit to print out on the paper roll 38.

With regard to the implementation of FIG. 4, the interface 48 includes a comparator 50 having one input receiving the data signal from the pager 14 through the connector 30 and having another input connected to a voltage reference circuit 52. The comparator 50 is implemented in the particular implementation by an LH339 comparator integrated circuit chip. This has suitable input and output characteristics to accommodate different types of specific pagers and printers.

A voltage regulator circuit 54 is energized from the battery of the vehicle 12 to provide a suitable operating voltage for the remaining circuitry of the interface 48 and the aforementioned +5-volt circuitry of the printer 16. A fuse 56 rated to protect the voltage regulator 54 based on the maximum current rating of the particular voltage regulator used is connected between the battery of the vehicle 12 and the voltage regulator chip.

The circuitry of the interface 48 of the preferred embodiment illustrated in FIG. 4 is mounted on a mounting member, such as a printed circuit board or the like. This assemblage is disposed along the inside surface of the left end wall of the holster 26 as viewed in FIGS. 2 and 3. The pins 30*a*, 30*b* of the connector 30 can be mounted on the mounting member or they can be separate, but in any event they are connected by suitable conductors (e.g., printed circuit conductors or discrete wires) into the interface 48 as illustrated in FIG. 4.

The three connections for the comparator 50 output data signal, +5V, and electrical ground or common shown in FIG. 4 between the interface 48 and the printing means 44 are made by respective wires extending from the interface 48, through a hole in the holster 26 and through an aligned hole in the housing 34 of the printer 16. The location of these holes is not critical (other than to be out of the way of the pager 14) but they are preferably hidden such as schematically illustrated in FIG. 3 by hole 58 defined in the side of the holster 26 which is in contact with the housing 34 as shown in FIG. 2. A fourth wire extends through these aligned holes to provide the vehicle battery voltage to the interface 48 represented in FIG. 4 (this and the other wires are generally depicted in FIG. 3 and marked with reference numeral 60). Vehicle battery power is connected to the printer 16 through a power cord as is known.

In the particular implementation illustrated in FIG. 4, the conversion effected by the interface 48 changes the level of the RS232 signal from the pager 14 to a TTL level compatible with the circuitry of the printer 16. Data transfers between the pager 14 and the printer 16 are at 1,200 baud for the illustrated implementation. This, or another baud rate, is selectable in known manner via option selection programming of the pager 14.

To use the present invention an operator at the computer 4 commands the paging network communication program 6 to transmit an entered message 8 This transmits the message 8 through the paging network 10 to the pager 14 which has been addressed under the aforementioned operator control of the computer 4. Conventionally, each pager 14 has a seven-digit local telephone number by which it is called. It is to be noted, however, that more than one pager 14 can be programmed to respond to the same telephone number. Although the computer 4 transmits the seven-digit telephone number, during the communication process through the paging network 10, the telephone number is converted into the appropriate coding structure used in the paging network 10 as known in the art (eg., the telephone number is converted to the capcode).

A transmitted message addressing a particular pager is received by that pager 14 and simultaneously sent to the printer 16 which is thereby activated to print the message on the paper from the roll 38 for the implementation of FIG. 2. The pager 14 is programmed in known manner to its selectable option whereby it automatically outputs, through its serial port 24, transmissions as they are received.

Another aspect of the present invention is that the pager 14 can be disconnected from the printer 16 by manually removing the pager 14 from the mounting holster 26. This is done merely by pulling the pager 14 to the right relative to the holster 26 as viewed in FIG. 2. This disconnects the output port 24 of the pager 14 from the connector 30 of the holster 26. The disconnected pager 14 can then be moved from the vehicle 12 and the printer 16, such as by being carried on the clothing of the craft technician or on a conventional holster.

While disconnected from the holster 26 and the printer 16, the pager 14 is still active so that it continues to receive any other transmitted messages containing its address. These messages are stored in the pager in known manner and can be displayed in known manner through the display 20 as desired by the user.

Additionally, the pager 14 can be returned to the mounting holster 26, connected to the connector 30, and manually actuated to output to the printer 16 a selected message. The printer 16 responds in the same manner as described above to print the selected message out on the paper of the roll 38. This occurs in response to the user actuating the buttons 22 in one of the following ways.

To print all messages in memory

1. From the "At rest" screen of the pager 14, press the green button 22*b* to display all messages (arrows on top line of display), one arrow will be flashing.
2. Press the red button 22*a*, a row of icons will appear on the bottom row with the middle icon flashing.
3. Use the right/left arrow keys 22*c*, 22*d* to select the multiple pieces of paper icon.
4. Press the red button 22*a* when the multiple pieces of paper icon is flashing and all pages in memory will be output and printed.

To print one message, there are three alternatives

Alternative A:

1. From the "At rest" screen, press the green button 22*b* to display all messages (arrows on top line of display), one arrow will be flashing.
2. Use the right/left arrow keys 22*c* 22*d* to select the arrow that corresponds to the desired message.
3. Press the red button 22*a*, a row of icons will appear on the bottom row with the middle icon flashing.
4. Use the right/left arrow keys 22*c*, 22*d* to select the single piece of paper icon.
5. Press the red button 22*a* when the single piece of paper icon is flashing and the currently selected page will be output and printed.

Alternative B:

1. From the "At rest" screen, press the green button 22*b* to display all messages (arrows on top line of display), one arrow will be flashing.
2. Use the right/left arrow keys 22*c* 22*d* to select the arrow that corresponds to the desired message.
3. Press the green button 22*b*, the text of the selected message will appear on the screen.
4. Press the red button 22*a*, a row of icons will appear on the bottom row with the middle icon flashing.
5. Use the right/left arrow keys 22*c*, 22*d* to select the single piece of paper icon.
6. Press the red button 22*a* when the single piece of paper icon is flashing and the currently selected page will be output and printed.

Alternative C:

1. From the "At rest" screen, press the green button 22*b* to display all messages (arrows on top line of display), one arrow will be flashing.
2. Use the right/left arrow keys 22*c*, 22*d* to select the arrow that corresponds to the desired message.

3. Press the green button 22*b*, the text of the selected message will appear on the screen.
4. Press the left/right arrow keys 22*c*, 22*d* to move between messages to find the desired messages.
5. Press the red button 22*a*, a row of icons will appear on the bottom row with the middle icon flashing.
6. Use the right/left arrow keys 22*c*, 22*d* to select the single piece of paper icon.
7. Press the red button 22*a* when the single piece of paper icon is flashing and the currently selected page will be output and printed.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. An automated hard-copy mobile remote communication apparatus, comprising:

a printer including:

a housing providing means for mounting said printer in a vehicle; and means, disposed in said housing, for printing data onto paper;

a pager having a data output connector releasably connected to said means for printing data; and means for releasably connecting said pager to said housing such that said pager can be removed from said printer and the vehicle without removing said printer, wherein said means for releasably connecting said pager to said housing includes a mounting holster having a coupling for connecting to said data output connector of said pager and for connecting to said means for printing data onto paper.

2. An apparatus as defined in claim 1, wherein said mounting holster is attached to said housing of said printer.

3. An automated hard-copy telephone craft technician communication system, comprising:

a telephone company computer system including a computer programmed with a service message for a telephone craft technician remotely located in a vehicle and also programmed with a program for transmitting data through a paging network;

a printer mounted in the vehicle, said printer having a data input for receiving data defining alphanumeric characters to be printed on paper loaded in said printers;

a pager mounted in the vehicle, said pager including means for receiving data transmitted from said telephone company computer system through the paging network, and said pager further including means, connected to said data input of said printer, for automatically communicating received data to said printer substantially simultaneously with receiving the transmitted data; and a mounting holster having a coupling connected both to said means for automatically communicating received data of said pager and to said data input of said printer.

4. An apparatus as defined in claim 3, wherein said mounting holster is attached to said printer.

5. A method of communicating information to a vehicle, comprising:

transmitting a message through a paging network to an addressed pager disposed in a vehicle;

receiving a transmitted message in the addressed pager and simultaneously activating a printer, directly from the pager, to print onto paper the received message, said printer disposed in the vehicle and connected to said pager;

disconnecting said pager from a coupling inside a mounting holster attached to said printer;

moving said disconnected pager away from said vehicle and said printer;

receiving another transmitted message in said pager;

storing said another transmitted message in said pager;

returning said pager to the vehicle and reconnecting said pager to said coupling inside said mounting holster attached to said printer; and actuating said pager in said mounting holster to print out a selected stored transmitted message through said reconnected printer.

6. A method of communicating information to a telephone craft technician in a vehicle, comprising:

entering telephone craft technician service messages into a computer at a telephone company office, which computer is programmed and connected for communicating with a paging network;

actuating the computer for transmitting a selected craft technician service message through the paging network to an addressed pager;

receiving a transmitted craft technician service message in the addressed eager and substantially simultaneously printing onto paper the received craft technician service message, wherein said pager is releasablv mounted on a printer mounted in a telephone craft technician's van;

disconnecting said pager from a coupling of a mounting holster connected to said printer;

moving said disconnected pager away from said van and said printer;

receiving another transmitted message in said pager;

storing said another transmitted message in said pager;

returning said pager to the van and reconnecting said pager to said coupling of said mounting holster by sliding said pager into said mounting holster; and actuating said pager to print out a selected stored transmitted message through said reconnected printer.

7. An automated hard-copy mobile remote communication apparatus, comprising:

a printer to mount in a vehicle and to print output onto paper in the printer;

a pager having a data output connector; and a mounting holster connected on the printer, the mounting holster including therein a coupling connected in electrical communication with the printer and releasably connected with the data output connector of the pager such that the pager can be removed from the printer and the vehicle without removing the printer.

8. An apparatus as defined in claim 7, wherein the mounting holster has a cavity in which the coupling is disposed and into and out of which the pager is slidable to engage and disengage the coupling.

9. An apparatus as defined in claim 7, wherein the printer has a housing and the mounting holster is attached by screws to the housing.

10. An apparatus as defined in claim 7, wherein the mounting holster further includes an interface disposed therein and connected in electrical circuit to the coupling and the printer.

11. An apparatus as defined in claim 10, wherein the mounting holster has a cavity in which the coupling and the interface are disposed and into and out of which the pager is slidable to engage and disengage the coupling.

12. An apparatus as defined in claim 11, wherein the printer has a housing and the mounting holster is attached by screws to the housing.

* * * * *

UNITED STATES PATENT AND TRADEMARK OFFICE

CERTIFICATE OF CORRECTION

Patent No.: 5,903,817

Dated: May 11, 1999

Inventors: Myron C. Butler and Mark R. Humphreys

It is certified that errors appear in the above-identified patent and that said Letters Patent is hereby corrected as shown below:

Column 1, line 31, Column 1, line 31, change "eg" to --e.g.--.

Column 2, line 27, insert --,-- after "means".

Column 2, line 28, change "papers" to --paper--, and insert --.-- after said "paper".

Column 2, line 39, change "pagers" to --pager--, and insert --,-- after said "pager".

Column 2, line 46, change "," to --;--.

Column 2, line 50, change "hardcopy" to --hard-copy--.

Column 4, line 1, insert --,-- after "program".

Column 4, line 20, change "vanes" to --van's--.

Column 4, line 28, insert --.-- after "22f)".

Column 4, line 45, change "inventions" to --invention--, and insert --.-- after said "invention".

UNITED STATES PATENT AND TRADEMARK OFFICE
CERTIFICATE OF CORRECTION

Patent No.: 5,903,817

Dated: May 11, 1999

Inventors: Myron C. Butler and Mark R. Humphreys

It is certified that errors appear in the above-identified patent and that said Letters Patent is hereby corrected as shown below:

Column 5, line 3, change "Counting" to --Mounting--.

Column 5, line 28, insert --.-- after "printer".

Column 5, line 65, change "LH339" to --LM339--.

Column 6, line 26, insert --,-- after "pager 14)".

Column 6, line 44, insert --,-- after "invention".

Column 6, line 46, insert --.-- after "message 8".

Column 6, line 57, change "eg." to --e.g.--.

UNITED STATES PATENT AND TRADEMARK OFFICE
CERTIFICATE OF CORRECTION

PATENT NO. : 5,903,817

DATED : May 11, 1999

INVENTOR(S) : Myron C. Butler and Mark R. Humphreys

It is certified that error appears in the above-identified patent and that said Letters Patent is hereby corrected as shown below:

Column 7, line 22, insert -- -- -- after "memory".

Column 7, line 38, insert --,-- after "22c".

Column 8, line 4, change "messages" to --message--.

Column 9, line 30, change "eager" to --pager--.

Signed and Sealed this

Second Day of May, 2000

Attest:

Q. TODD DICKINSON

Attesting Officer

*Director of Patents and Trademarks*